United States Patent [19]

Brodersen

[11] 4,000,660
[45] Jan. 4, 1977

[54] DRIFT-COMPENSATED FREE-ROTOR GYRO

[75] Inventor: Rolf K. Brodersen, Orlando, Fla.

[73] Assignee: The United States of America as represented by the Secretary of the Navy, Washington, D.C.

[22] Filed: Oct. 31, 1975

[21] Appl. No.: 627,637

[52] U.S. Cl. .............................. 74/5.43; 74/5.6 B; 74/5.7

[51] Int. Cl.² ...................................... G01C 19/30

[58] Field of Search ................... 74/5.7, 5.6 B, 5 R, 74/5.43; 308/DIG. 1

[56] References Cited

UNITED STATES PATENTS

| | | | |
|---|---|---|---|
| 3,115,784 | 12/1963 | Parker | 74/5.7 X |
| 3,257,854 | 6/1966 | Schneider et al. | 74/5.7 X |
| 3,358,514 | 12/1967 | Hauf et al. | 74/5.7 |
| 3,446,082 | 5/1969 | Speen et al. | 74/5.7 X |
| 3,522,737 | 8/1970 | Brenot | 74/5.7 |
| 3,604,277 | 9/1971 | Stripling et al. | 74/5.7 X |
| 3,727,466 | 4/1973 | Kraus et al. | 74/5.7 X |
| 3,747,417 | 7/1973 | Beardmore | 74/5.7 X |
| 3,765,250 | 10/1973 | Graefe | 74/5.7 X |

*Primary Examiner*—Samuel Scott
*Assistant Examiner*—F. D. Shoemaker
*Attorney, Agent, or Firm*—Richard S. Sciascia; John W. Pease

[57] ABSTRACT

A fluidic/pneumatic, two-axis, free-rotor gyro in which the free-inertia rotor is gas bearing supported on a spherical portion of a rotatable gas bearing rotor, both rotors being connectable to controllable sources of drive fluid pressure for separate drive and pneumatic pickoff and torquer units, the pickoff units providing control signals representative of the frequency of each rotor. The invention includes a further aspect of comparator control circuits responsive to said control signals for selecting and maintaining the speed of each of the two rotors independently and in a ratio selected to provide $G^2$ drift compensation. A further aspect of the invention comprises the compensation of case-erection drift by auto-erection drift by specific scaling of the gas-bearing and windage air gap parameters.

4 Claims, 16 Drawing Figures

GAS BEARING RESTRICTOR

FIG. 12B

SUSTAINER JET NOZZLE LAMINATE

FIG. 12A

BALL BEARING $K_B \rightarrow$ AUTO ERECTION TORQUE COEFFICIENT
$W_S \rightarrow$ SPIN RATE OF GAS BEARING ROTOR
$n \rightarrow$ AUTO ERECTION ANGLE SHOWN $K_R \rightarrow$ CASE ERECTION TORQUE COEFFICIENT
$W_R \rightarrow$ FREE ROTOR SPIN SPEED
$\varepsilon \rightarrow$ CASE ERECTION ANGLE SHOWN

FIG. 13

COMPENSATION OF AUTO-ERECTION AND CASE ERECTION DRIFT

FIG. 14

GAS BEARING DRIFT TORQUE $\quad$ CASE ERECTION DRIFT TORQUE $$\frac{\omega_S r_B^3 \ell_B}{h_B} = \frac{\omega_R r_C^3 \ell_C}{h_C}$$

AUTO-ERECTION AND CASE-ERECTION DRIFT PARAMETERS

DRIFT-COMPENSATED FREE-ROTOR GYRO

BACKGROUND OF THE INVENTION

The invention is in the filed of gyroscopic devices and relates in particular to a fluidic/pneumatic two-axis free-rotor gyro of the rotating spherical gas-bearing type capable of operating entirely on gas with no electrical inputs or outputs.

In inertial control systems for land, air, space or sea vehicles, measurements made by accelerometers and other devices must be carried out in relation to a stable system of references which can be defined in terms of angular relationships, such as angular precession, obtainable from gyroscopic devices. In guidance systems, control signals are supplied by displacement gyros, these signals being proportional to the angular attitude deviation of the guided vehicle or missile.

In many important applications, including those mentioned above, it is desirable to provide gyros requiring an upper limit of typically 1°/hour gyro drift rate in precision angular reference for typically ± 5° or less, and to combine in such gyros the capability to tolerate severe environmental loads and wide temperature range and to do so in a simple manner providing reliability and low initial cost. The present invention provides in a fluidic/pneumatic, two-axis, free-rotor gyro a selection and arrangement of elements which result in the capability of 1°/hour or less composite drift rate, at low initial cost, with complete fluidic/pneumatic interface capability, and with stationary casing for stationary pickoffs and torquers, thereby eliminating the need for resolvers for pickoff and torquers functions.

SUMMARY OF THE INVENTION

The invention comprises a fluidic/pneumatic two-axis free-rotor gyro in which a free inertial rotor spins on a spherical gas bearing which has extension shafts supported in a stationary casing on preloaded angular contact bearings. Both the turbine and the free rotor are formed with steps for fast spinup and jets for sustaining speeds and are operated at independent speeds from a source or sources of gas power. Pickoffs and torquers are formed and supported in the stationary casing such that resolvers are not required. In accordance to one specific aspect of the invention a pneumatic spin monitor system and associated comparator control circuits are provided for selecting and maintaining the speed of each of the two rotors independently and in a fixed selected ratio to provide $G^2$ drift compensation. In another aspect of the invention the scaling of the gas bearing and windage air gap parameters are selected such that the two error torques causing auto-reaction and case-erection drift are equal and of opposite polarity to compensate each other and leave a zero drift error.

DESCRIPTION OF THE PREFERRED EMBODIMENT

Figure 1:
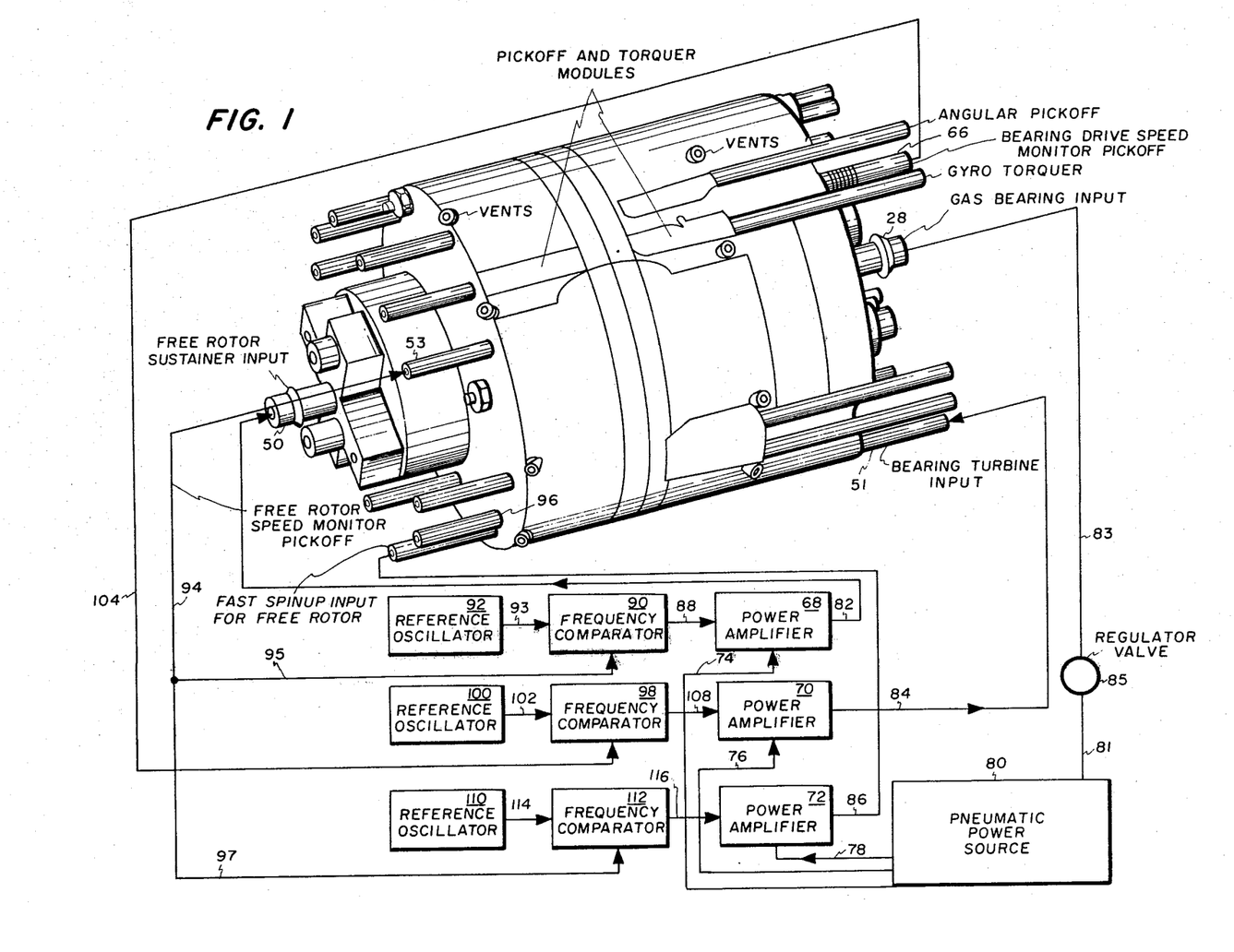
FIG. 1 is a diagrammatic perspective of a gyro and associated pneumatic power and control system incorporating applicant's invention.

Referring initially to FIG. 1, there is shown apparatus incorporating applicant's invention, including in perspective a gyro 10, and diagrammatically a suitable simplified power source and control equipment, comprising oscillators, comparators and power amplifiers, connected to speed monitoring pickoffs on the gyro, as will be explained, to bring a rotatable bearing rotor and a free rotor up to speed and then maintain a desired ratio of speed between the two rotors.

Figures 2, 3, 4, 5, 6, 7, 8:
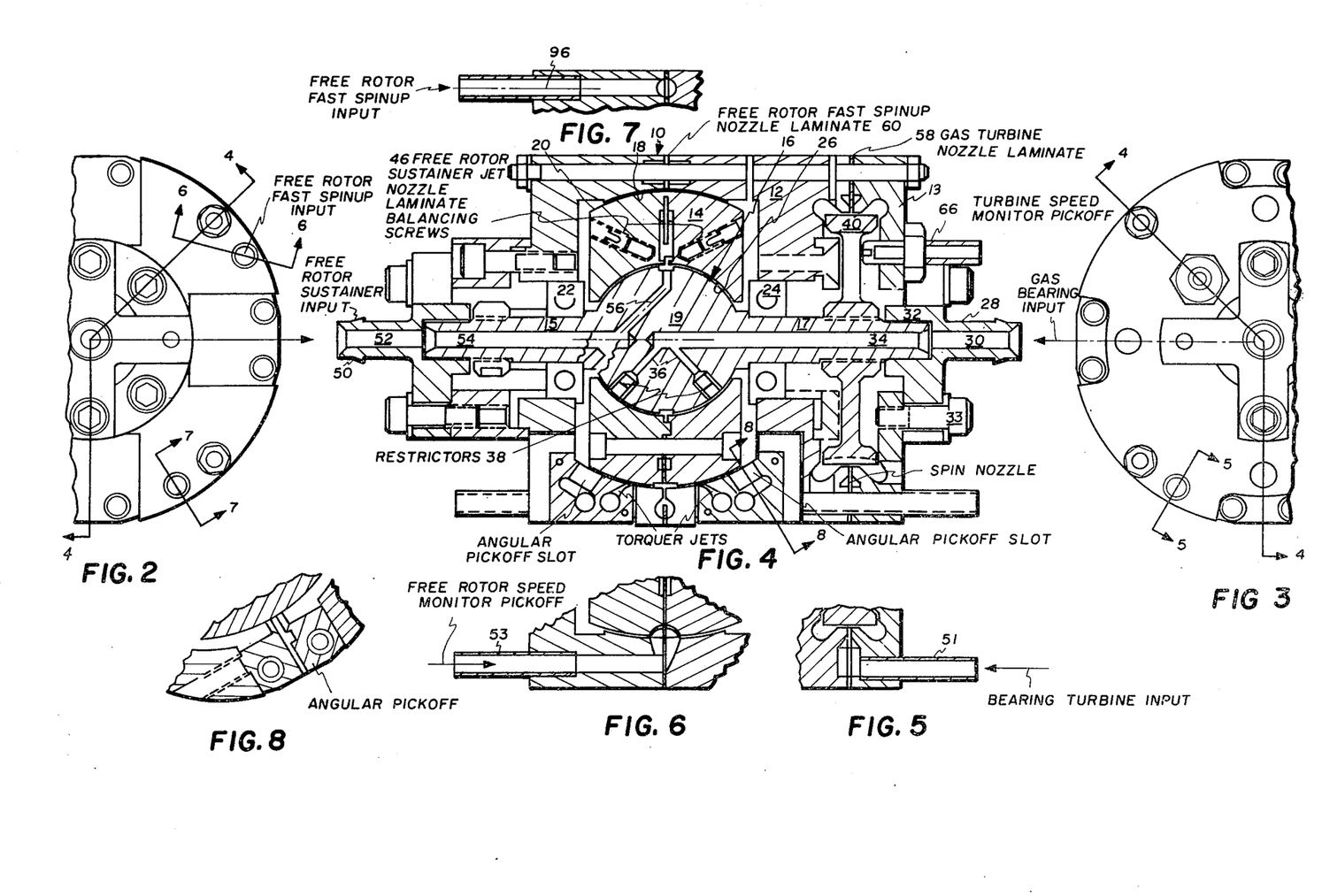
FIGS. 2 and 3 are partial opposite end elevations of the gyro of FIG. 1.
FIG. 4 is an angular cross section taken on line 4—4 of FIG. 2 showing interior details of the gyro of FIG. 1.
FIGS. 5, 6, 7 and 8 are partial cross sections taken on lines 5—5, 6—6, 7—7 and 8—8 of FIGS. 2, 3, and 4, respectively, as indicated to provide detailed explanation of various inputs and pickoffs of the gyro.

With this generalization in mind and referring to FIGS. 2, 3 and 4, FIG. 4 is a composite sectional view taken on line 4—4 of FIG. 2, and shows the gyro 10 as comprising a stationary casing 12, a free inertial rotor 14 and a spherical portioned rotatable bearing rotor 16. The casing 12 is formed with a curved interior surface 18 in air gap spaced relation to a complementary curved outer surface 20 on the free rotor 14. The bearing rotor 16 is formed with oppositely extending spindles 15 and 17 and a central spherically surfaced bearing portion 19 as indicated. Preloaded angular contact ball bearings 22 and 24 rotatably support the bearing rotor 16 via its spindles 15 and 17. The free inertial rotor 14 is formed with a hollow interior portion defined by the surface 26 and contains the spherical portion 19 of the bearing rotor 16 with the interposition of a gap forming a gas bearing for the free rotor. The spaced mating surfaces 18 and 20 respectively of the outer casing 12 and free rotor 14 form a windage air gap. A gas bearing input nozzle 28 having a central passageway 30 forms a part of an end piece 32 secured to the casing 12 by bolts 33 or other suitable means. Further passageways including axial passageway 34 and radial passageways 36 having restrictors 38 provide the necessary duct work to supply gas under pressure to the space gap between the free rotor 14 and the rotatable bearing 16 to form the gas bearing for the free rotor.

Figure 9A:
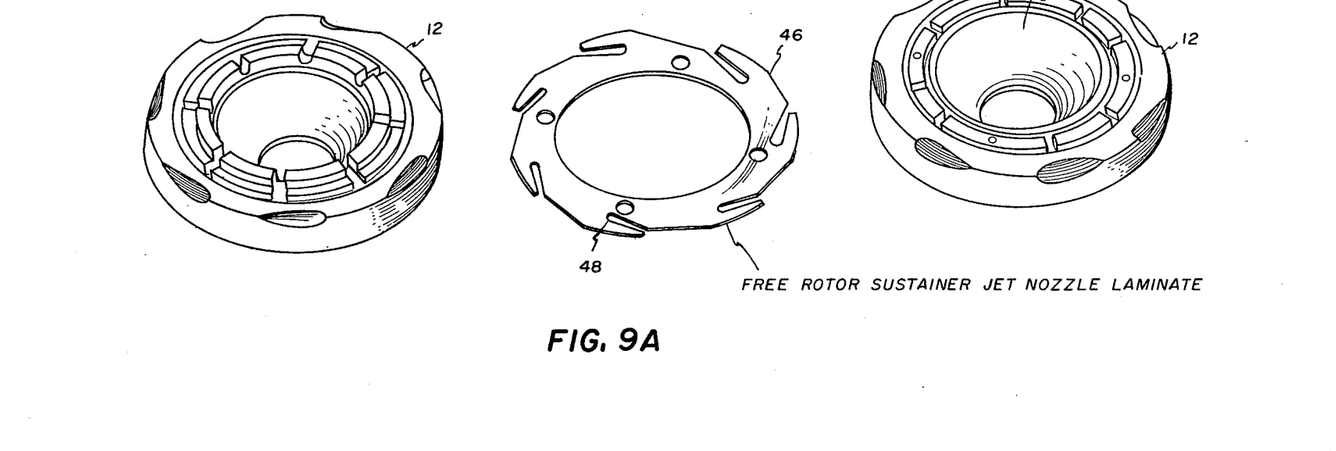
FIGS. 9A, 9B, 10, 11 and 12A and B are exploded perspective views and assembled perspective views of the several parts of the gyro of FIG. 1 showing the relationship thereof.
Figure 9B:
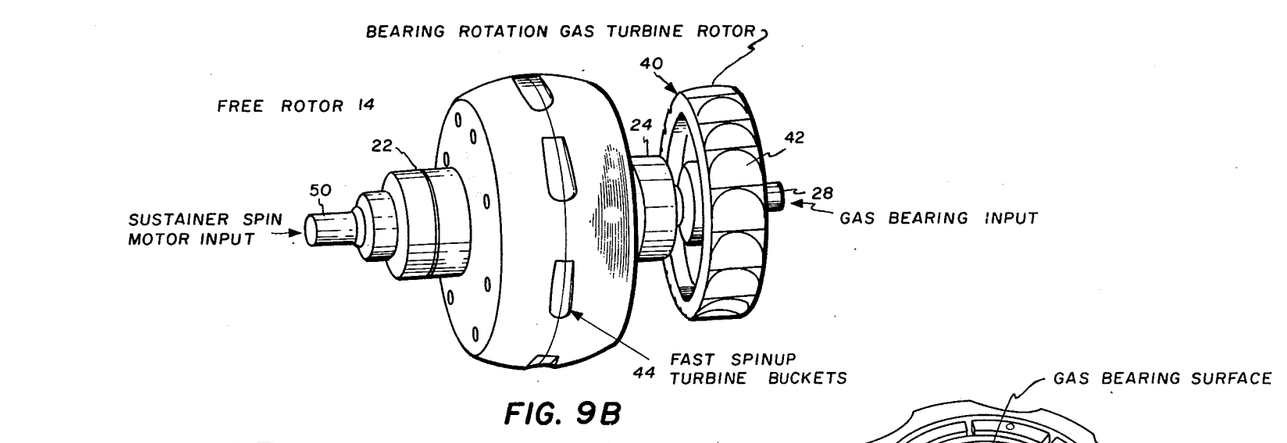
Figure 12A:
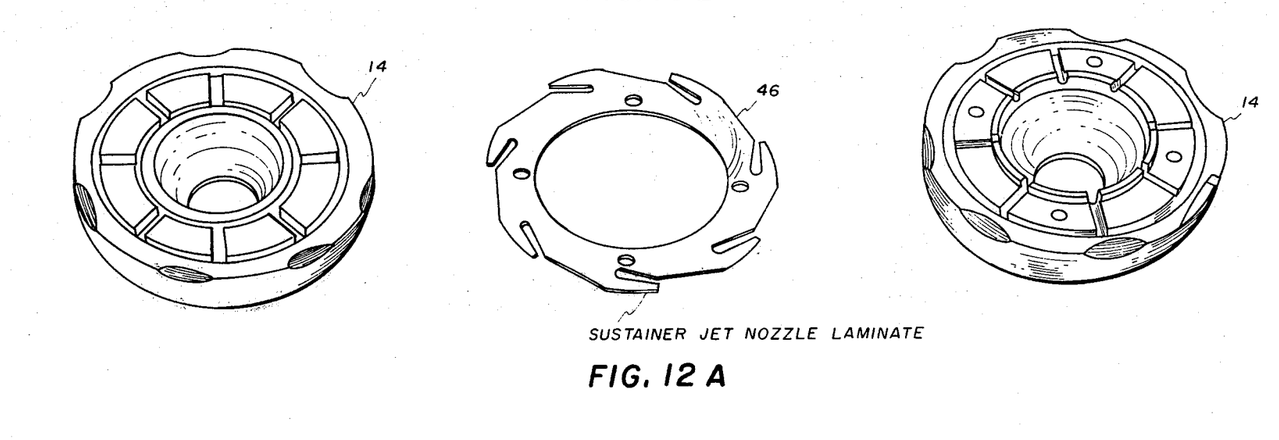
Figure 12B:
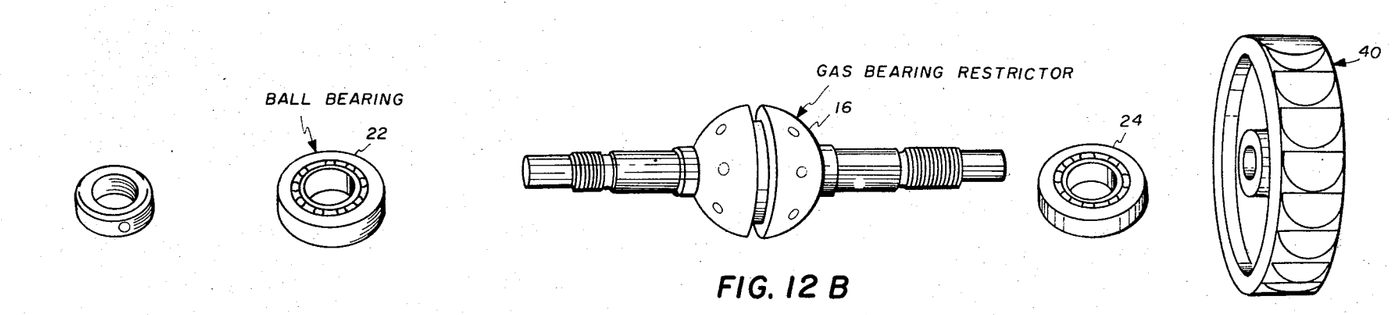

As shown in FIG. 4, a gas turbine 40 is non-rotatably mounted on bearing spindle 17 by splines or other suitable means for rotating the bearing rotor 16 responsive to the reception of fluid power. Both the gas turbine 40 and the free rotor 14 are formed with respective fast spin buckets and jet nozzle laminates. In FIG. 9B the fast spinup buckets for the turbine 40 are shown at 42 and the buckets for the free rotor 14 are shown at 44. In FIG. 9A is shown the two split halves of the free rotor 14 and the free rotor sustainer jet nozzle laminate 46 which provides the means for sustaining free rotor speed via the action of its several reaction jet slots 48. In the assembled view in FIG. 9B the gas bearing input corresponding to nozzle 28 in FIG. 4 is shown, as is also the sustainer spin motor input 50, i.e., the free rotor sustainer spin input, shown at 50 in both FIGS. 4 and 9B. In FIG. 4 the duct work to the sustainer laminate 46 is shown by passageways 52, 54 and 56. In FIGS. 12A and 12B is shown the relationship of the gas bearing rotor 16, the ball bearing races 22 and 24, the turbine 40 and the free rotor 14 with its sustainer jet laminate 46.

Figure 10:
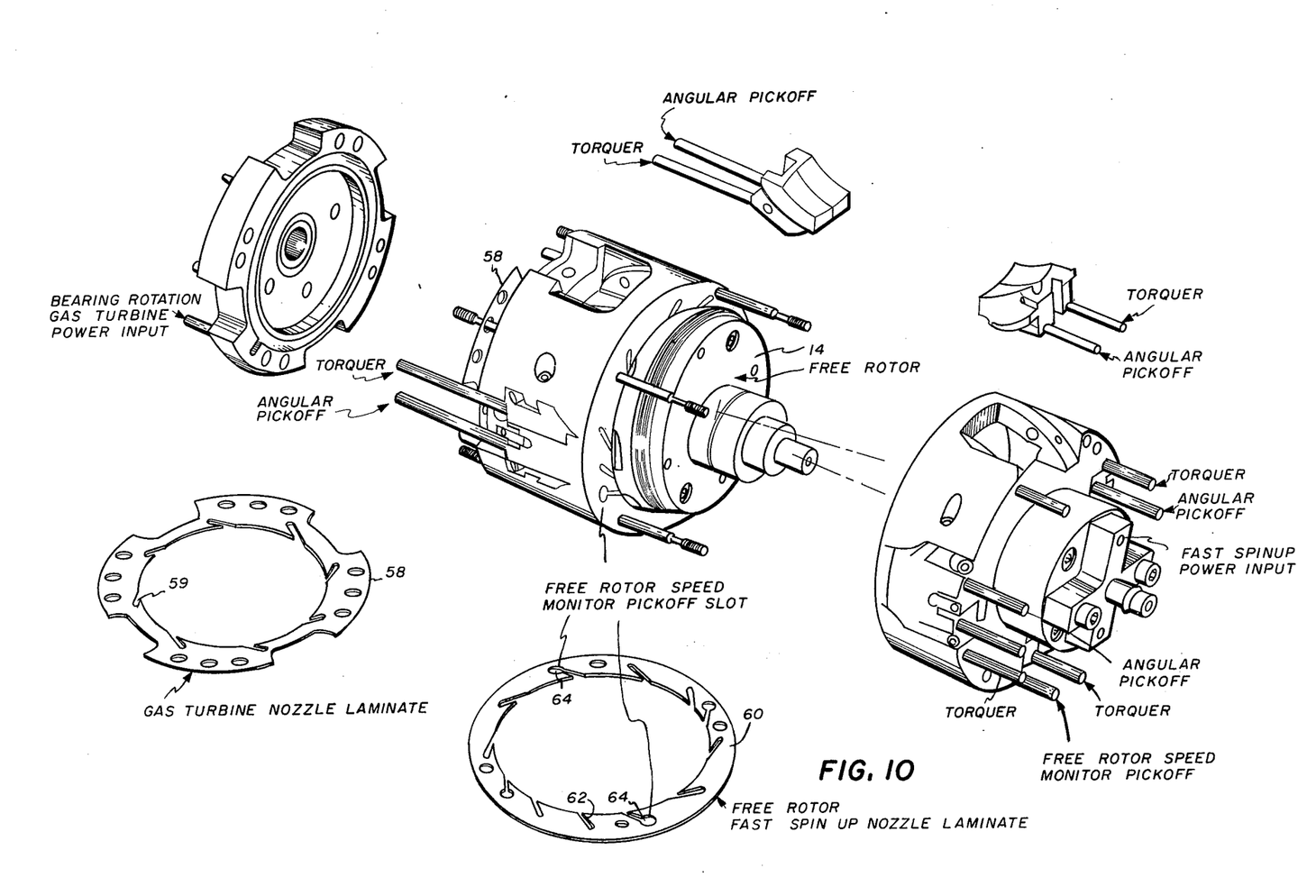
Figure 11:
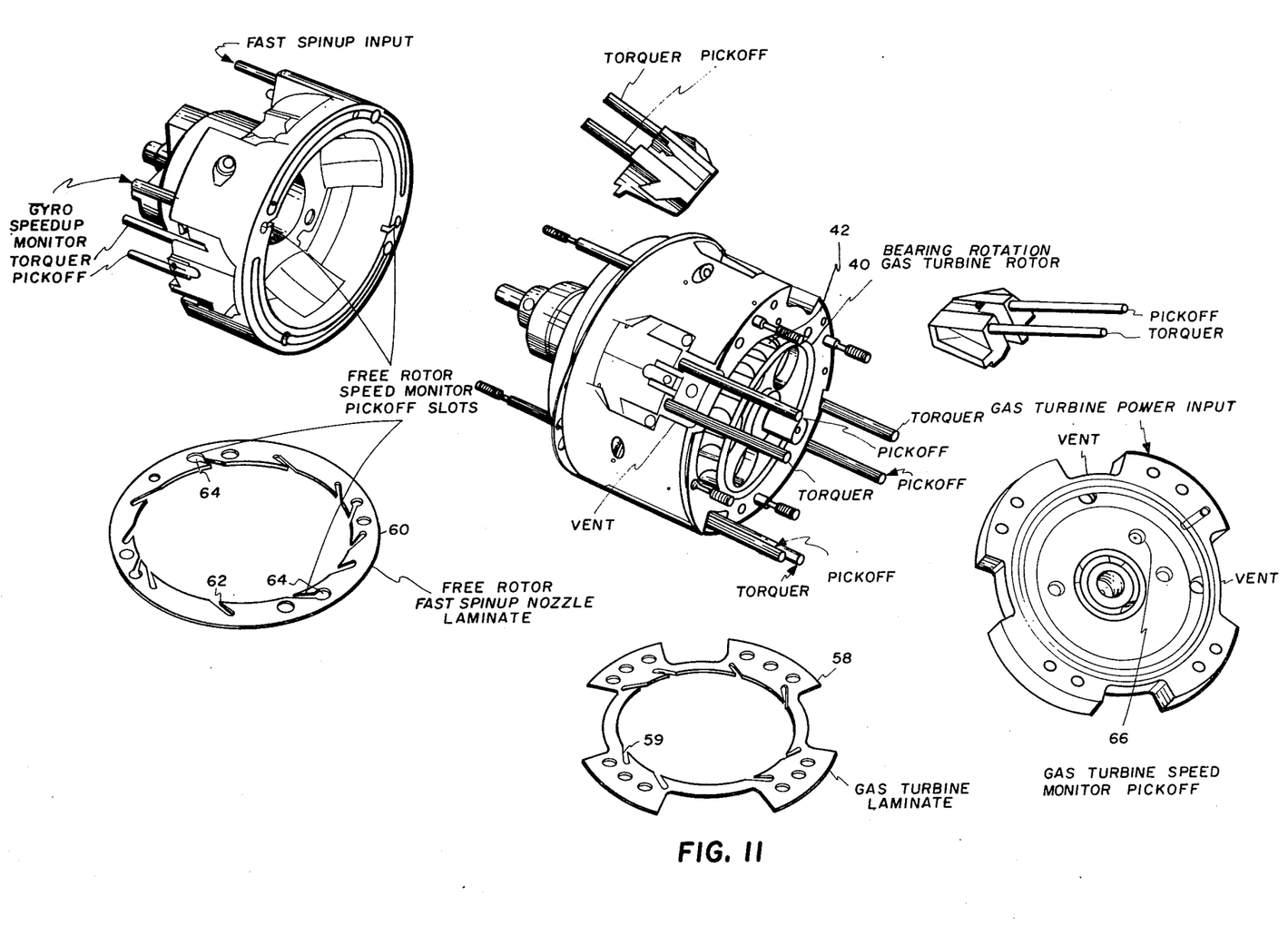

In FIGS. 10 and 11 is shown a gas turbine nozzle laminate 58 and a free rotor fast spinup nozzle laminate 60, together with the associated parts of the gyro in perspectives taken from angles that best show details of both the free rotor and turbine drive. The free rotor fast spinup laminate 60 shown in FIG. 10 is positioned as shown in FIG. 4 between the halves of the split casing 12 to provide nozzles 62 through which fluid under pressure is applied to the fast spinup buckets 44 (FIG. 9B) to bring the free rotor quickly up to speed. The gas turbine laminate 58 which fits between the casing 12 and its end cap section 13, as shown in FIG. 4, provides the jet nozzles as indicated at 59 (FIGS. 10 and 11) to direct fluid under pressure against the gas turbine buckets 42 seen in FIGS. 9B and 11.

In accordance with the above the bearing rotor may be brought up to speed quickly by directing fluid under pressure against the buckets 42 of the gas turbine rotor 40. The free rotor 14 may be brought quickly up to speed by directing fluid under pressure against its buckets 44. And the free rotor may be maintained at desired speed by directing fluid under pressure through the passageways 52, 54 and 56 (FIG. 4) to the reaction nozzles 48 (FIG. 9A) of the free rotor sustainer jet nozzle laminate 46 (FIGS. 9A and 4).

However, it is an aspect of the subject invention that the speeds of the free rotor and bearing rotor be maintained each at a desired speed and at a desired ratio of speed of one to the other to provide $G^2$ drift compensation. $G^2$ drift is that part of the gyro's drift rate that is proportional to the square of the acceleration input ($G^2$). Under the influence of such an external acceleration input, the free rotor is displaced from its normal centered position on the gas-bearing. Two error torque components result from this offset and produce a "$G^2$ drift"; one of these torques is proportional to the sum of the two angular rates ($\omega_1 + \omega_2$) of the two rotors, and may be called a "pumping term", while the other term is proportional to the difference of the angular rates of the two rotors ($\omega_2 - \omega_1$) and may be called a "drag" torque: With $\omega_2 = \omega_1$, both rotors are synchronous, and therefore, no drag-term is present. Fluid, however, must be continuously squeezed in and out of (through) the narrow portion of the bearing gap once every revolution. The resulting torque is maximum when the fluid is incompressible and goes to zero as the compressibility goes to infinity. Accordingly, for a fluid with finite compressibility, a finite "pumping" torque results which, however, can be compensated by the "drag" torque term (which acts with the opposite polarity) provided that the ratio $\omega_2/\omega_1$ is selected so as to meet this condition. To monitor the rotational speed of the free rotor, pickoff slots 64 are provided in the laminate 60 as shown in FIGS. 10 and 11. To monitor the rotational speed of the bearing rotor 16 (FIG. 4) a gas turbine speed monitor pickoff 66 is provided which reacts in pulsed fluid pressure to rotation of the gas turbine 40.

Referring to FIG. 1 there is shown in accordance with the invention three comparator control circuits responsive to the control signals obtained from the free rotor monitor speed pickoff and the gas bearing drive speed monitor pickoff for selecting and maintaining the speed of each of said rotors independently and in a ratio selected to provide $G^2$ drift compensation. Each control circuit comprises a frequency comparator which receives a reference frequency signal from a reference oscillator and a control frequency signal from the gyro and provides an output signal to a power amplifier to provide an output from the amplifier as needed to maintain the speed of the associated free rotor or bearing rotor as required.

Thus, in FIG. 1 are shown three power amplifiers 68, 70 and 72 connected by lines 74, 76 and 78 to a pneumatic power source 80 to receive fluid under pressure and having outlet lines 82, 84 and 86 for delivering fluid under pressure respectively to the rotor sustainer input 50, to the bearing turbine input 51 and to the free rotor fast spinup input 96. Power amplifier 68 is controlled via line 88 from an associated frequency comparator 90 which is conditioned from output signals obtained from a reference oscillator 92 via line 93 and from a free rotor monitor pickoff 53 via lines 94 – 95. Rotor sustaining power from amplifier 68 is cut off when the reference frequency of oscillator 92 is matched by the free rotor monitor speed pickoff signal, and reapplied again when the rotor frequency falls below the preset frequency of oscillator 92. The control circuit of elements 92, 90 and 68 thus control free rotor sustainer input to maintain a desired preselected free rotor speed.

In the same manner (FIG. 4) the turbine 40 speed and hence the gas bearing rotor 16 speed is controlled (FIG. 1) via the power amplifier 70 from a reference frequency oscillator 100 providing a signal to a frequency comparator 98 via a line 102 and an output speed monitor signal obtained from a bearing drive speed monitor pickoff 66 which takes the bearing speed from the turbine 40 speed and transmits the speed signal (a pulsed signal) via line 104 to the frequency comparator 98 which provides an output control signal via line 108 to the power amplifier 70.

The fast spinup speed for the free rotor 14 is obtained from the power amplifier 72 served by its reference oscillator 110 and frequency comparator 112 connected via lines 114 and 116 as indicated. In this case the same free rotor monitor speed pickoff 53 is used and provides the free rotor frequency signal to the frequency comparator 112 via lines 94 and 97. The reference frequency of oscillator 110 is set slightly lower than that of oscillator 92 such that power from amplifier 72 will be cut out when the free rotor is close to desired speed. Thereafter the control circuit of the oscillator 92, comparator 90 and amplifier 68 take over to maintain the free rotor speed. The frequency of reference oscillator 92 (governing free rotor speed) and oscillator 100 (governing gas bearing rotor speed) are selected such that a desired ratio between the two is effected to provide $G^2$ drift compensation. The pneumatic power source 80 may be connected via lines 81 and 83 and a regulator valve 85 to provide the gas pressure at the gas bearing inlet 28.

In addition to compensation of $G^2$-sensitive drift rate by selection of spin speeds for the gas bearing rotor and the free rotor, the invention also contemplates compensation of case-erection drift by auto-erection drift by appropriate scaling of gas bearing and windage parameters. This will be explained hereinafter in relation to FIGS. 13 and 14.

Wherever the gas bearing parts, i.e., the bearing and free rotors, rotate relative to each other, aerodynamic torques are generated and the bearing becomes "hybrid." Acceleration insensitive torques create an "auto-erection" drift which can be compensated by "case erection" drift.

Case erection is a term used to describe the effect of windage drag torque as a function of angular attitude of the free rotor. The rotor tends to either seek a preferred attitude relative to the case (therefore: "case erection," as if restrained by a spring) or it tends to move away from a specific attitude (as if by negative spring-restraint or toggle-action).

Figure 13:
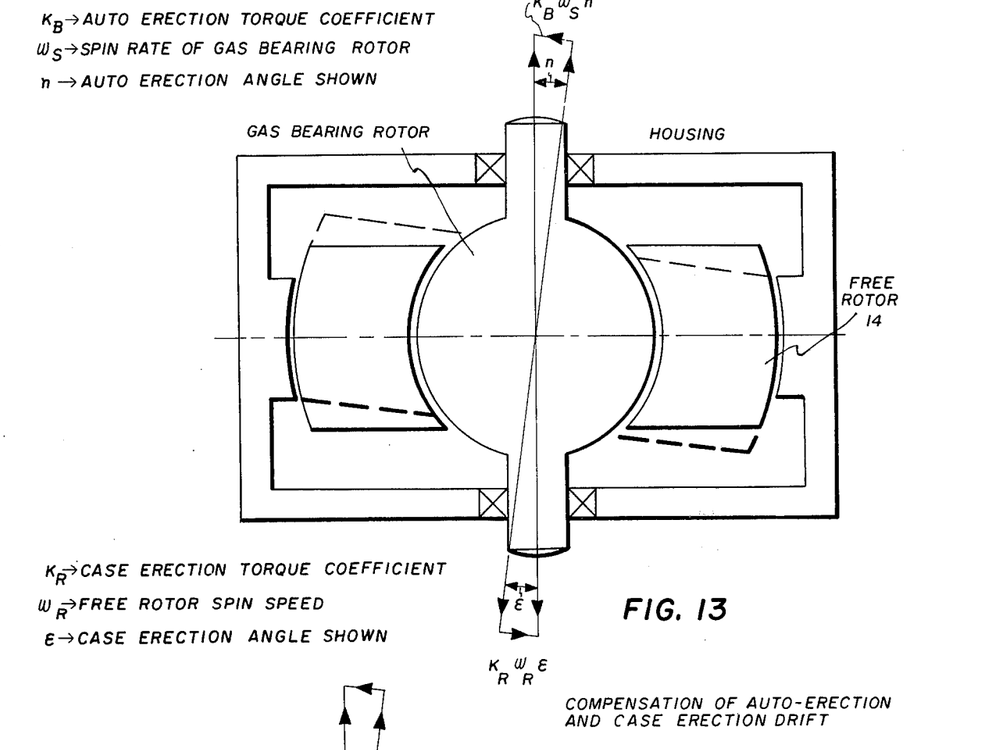
FIGS. 13 and 14 are diagrammatic representations of the relationship of bearing rotor, free rotor, and casing in compensation of auto-erection and case-erection drift.

This second mode is of interest for compensation purposes:

As illustrated in FIG. 13, the case erection torque can be approximated by $$M_{CE} = -K \left(\frac{\Delta A}{A}\right) \omega_R \sin \eta$$

where $$K = \left(\frac{8\pi}{3}\right)\frac{r_c^4 \mu}{h_c}$$

and
$\sin \eta \approx \eta$
so that $$M_{CE} \approx -\left(\frac{8\pi}{3}\right)\frac{r_c^4 \mu}{h_c} \eta \omega_R \frac{\Delta A}{A}$$

for small angles $\eta$.

The resulting moment can be sized to the magnitude required for compensation of viscous coupling. Additional compensation can be added by permanent magnet eddy current drag torque (to the gas/windage torque). $\Delta A/A$ can then be selected to match the viscous restraint $$\frac{M_{VC}}{\eta} ; \frac{\Delta A}{A}$$

gives the ratio of actual spherical gap surface to the surface of a complete sphere. For a relatively narrow equatorial band, this can be expressed as $$\frac{\Delta A}{A} = \frac{2\pi r l}{4\pi r^2} = \frac{l}{2r}$$

where $l$ represents the width of this band.
Accordingly, $$\frac{M_{CE}}{\eta} \approx \left(\frac{4\pi}{3}\right)\frac{r_c^3 \mu l_c \omega_R}{h_c}$$

Auto-Erection

For the spherical gas-bearing we obtain an auto-erection restraint (a positive spring restraint)

$$\frac{M_{VC}}{\eta} = K \omega_s .$$

where $$K = \left(\frac{8\pi}{3}\right)\frac{\mu r_B^4}{h_B} \cdot \frac{\Delta A_{BR}}{A_B} .$$

Here is again $$\frac{\Delta A_B}{A_B} = \frac{2\pi r_B l_B}{4\pi r_B^2} = \frac{l_B}{2r_B}$$

Therefore $$\frac{M_{VC}}{\eta} = \left(\frac{4\pi}{3}\right)\frac{\mu r_B^3 l_B}{h_B} \omega_s .$$

For compensation, it is required that $$\frac{M_{VC}}{\eta} = \frac{M_{CE}}{\eta} ,$$

or $$\frac{\omega_s r_B^3 l_B}{h_B} = \frac{r_c^3 l_c \omega_R}{h_c}$$

Figure 14:
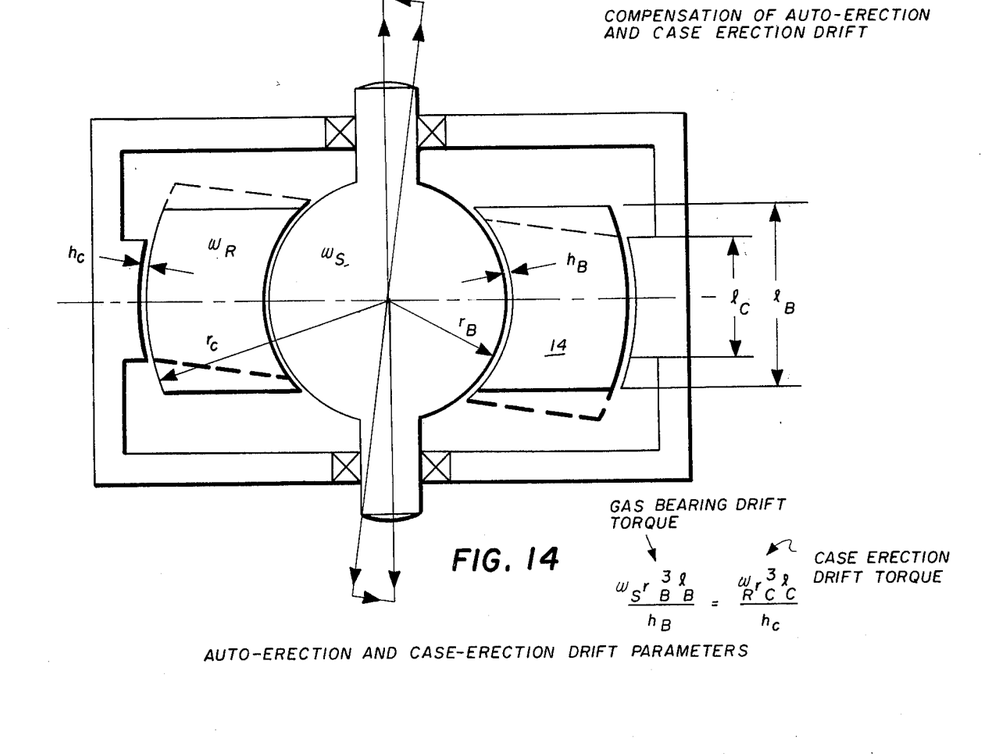

FIG. 14 identifies the design parameters and illustrates schematically this concept for compensation of auto and case-erection.

Since compensation of $G^2$-sensitive error torques, as discussed in the previous section, may require that $\omega_R \neq \omega_s$, a change in either $h_C$ or $l_c$ may be required to optimize these compensation schemes.

TABLE OF TERMS $G^2$ drift = That part of the gyro drift rate that is proportional to the square of the acceleration input.
$G^2$ = Square of the acceleration input.
$M_{CE}$ = Moment of case erection.
$\mu$ = Viscosity.
$K$ = Torque coefficient.
$R$ = Free rotor.
$\Delta A/A$ = Ratio of actual spherical gap surface to the surface of the complete sphere.
$\omega$ = Spin rate.
$r_c$ = Free rotor outer surface radius.
$h_c$ = Thickness of gas film separating free rotor and casing.
$\eta$ = Angle between the case erection torque vector and the spin reference axis.
$M_{VC}$ = Moment of viscous coupling or auto erection restraint.
$r$ = Radius.
$l$ = Width of equatorial band.
$B$ = Refers to bearing.
$A_B$ = Area of the bearing rotor.
$\omega_s$ = Gas bearing spin rate.
$l_B$ = Length of gas bearing surface.
$r_B^3$ = Gas bearing radius taken to third power.

$h_B$ = Gas bearing film thickness.
$\omega_R$ = Free rotor spin rate.
$l_c$ = Windage torque producing air gap length between free rotor and the case.
$r_c^3$ = Third power of free rotor outer surface radius.

It will be understood that various changes in the details, materials, and arrangements of parts, which have been herein described and illustrated in order to explain the nature of the invention, may be made by those skilled in the art within the principle and scope of the invention as expressed in the appended claims.

What is claimed is:

1. A fluidic/pneumatic two-axis free-rotor gyro of the rotating spherical gas-bearing type comprising:
  a. a casing having an annular curved inner surface;
  b. a bearing rotor having oppositely extending spindles and a central spherically surfaced bearing portion;
  c. bearing means for rotatably supporting said bearing rotor in said casing;
  d. a free enertia rotor having a hollow interior portion containing said spherical portion of said bearing rotor with the interposition of a gap forming a gas bearing for said free rotor and a curved portion mating with, but spaced from, said casing curved inner surface to form a windage air gap;
  e. a gas turbine mounted on one of said spindles for rotating said bearing rotor;
  f. said gas turbine and said free rotor having spin-up buckets for bringing said turbine and rotor up to speed and reaction jets for sustaining desired speed when connected to a source of pneumatic power; and
  g. a pneumatic spin monitor pickoff system connected to provide control signals representative of the free rotor frequency and bearing rotor frequency.

2. Apparatus according to claim 1 including
  a. comparator control circuits responsive to said control signals for selecting and maintaining the speed of each of said two rotors independently and in a ratio selected to provide $G^2$ drift compensation.

3. Apparatus according to claim 1, wherein
  a. the scaling of said gas bearing and windage air gap parameters are selected such that the two error torques causing auto-erection and case-erection drift are equal and of opposite polarity to compensate each other in accordance with the formula $$\frac{\omega_s r_B^3 l_B}{h_B} = \frac{r_c^3 l_c \omega_R}{h_c}$$

where
  $\omega_s$ represents gas-bearing spin rate,
  $l_B$ represents the length of the gas-bearing surface,
  $r_B^3$ represents the gas-bearing radius taken to the third power, and
  $h_B$ represents the gas-bearing film thickness, and
  where in the second expression
  $\omega_R$ represents the free rotor spin-rate,
  $l_c$ represents the windage torque producing air gap length between the free rotor and the case,
  $r_c^3$ represents the third power of the free rotor outer surface radius, and
  $h_C$ represents the thickness of the gas film separating the free rotor and the casing.

4. Apparatus according to claim 3, including
  a. comparator control circuits responsive to said control signals for selecting and maintaining the speed of each of said two rotors independently and in a ratio selected to provide $G^2$ drift compensation.

* * * * *